US009864593B2

(12) United States Patent
Chor (10) Patent No.: US 9,864,593 B2
(45) Date of Patent: Jan. 9, 2018

(54) CONVERSION TRACKING AND CONTEXT PRESERVING SYSTEMS AND METHODS

(71) Applicant: YAHOO HOLDINGS, INC., Sunnyvale, CA (US)

(72) Inventor: Jesse Chor, Bellevue, WA (US)

(73) Assignee: YAHOO HOLDINGS, INC., Sunnyvale, CA (US)

( * ) Notice: Subject to any disclaimer, the term of this patent is extended or adjusted under 35 U.S.C. 154(b) by 1 day.

(21) Appl. No.: 15/087,593

(22) Filed: Mar. 31, 2016

(65) Prior Publication Data

US 2016/0283215 A1 Sep. 29, 2016

Related U.S. Application Data

(63) Continuation of application No. 13/966,118, filed on Aug. 13, 2013, now Pat. No. 9,363,337, which is a continuation-in-part of application No. 13/855,641, filed on Apr. 2, 2013, now Pat. No. 8,935,400, and a continuation-in-part of application No. 13/855,649, filed on Apr. 2, 2013, now Pat. No. 9,197,692, said application No. 13/855,641 is a continuation of application No. 13/036,950, filed on Feb. 28, 2011, now Pat. No. 8,433,800, said application No. 13/855,649 is a continuation of application No. 12/852,730, filed on Aug. 9, 2010, now Pat. No. 8,438,245.

(51) Int. Cl.
| | |
|---|---|
| G06F 15/16 | (2006.01) |
| G06F 9/445 | (2006.01) |
| H04L 29/06 | (2006.01) |
| H04L 29/08 | (2006.01) |
| G06F 17/30 | (2006.01) |
| H04W 4/00 | (2009.01) |

(52) U.S. Cl.
CPC .......... *G06F 8/61* (2013.01); *G06F 17/30876* (2013.01); *H04L 67/025* (2013.01); *H04L 67/10* (2013.01); *H04L 67/2814* (2013.01); *H04L 67/303* (2013.01); *H04L 67/34* (2013.01); *H04L 67/42* (2013.01); *H04W 4/001* (2013.01)

(58) Field of Classification Search
CPC ..... G06F 8/61; G06F 17/30876; H04L 67/42; H04L 67/34; H04L 67/303; H04L 67/2814; H04L 67/025; H04L 67/10; H04W 4/001
USPC ........................................ 709/203, 225, 232
See application file for complete search history.

(56) References Cited

U.S. PATENT DOCUMENTS

| | | | |
|---|---|---|---|
| 2009/0094377 A1* | 4/2009 | Zahavi .............. | G06F 17/30905 709/232 |
| 2014/0098644 A1* | 4/2014 | Boudville ......... | G06F 17/30047 367/197 |

* cited by examiner

*Primary Examiner* — Phuoc Nguyen
(74) *Attorney, Agent, or Firm* — James J. DeCarlo; Greenberg Traurig, LLP (57) ABSTRACT

When a server receives a request for an information payload from a remote device, the server may determine the device's type and identify an optionally-installable application that can be used to access the information payload on devices of that type. When the optionally-installable application is not installed on the remote device, the server may store an identifier for the remote device and send the device a redirection message via which the device can obtain and install the application. Subsequently, when the server receives an installation indication from the application executing on a remote device, the server may identify the device as having recently been redirected to install the application and store or update a record indicating that an application-installation event occurred.

20 Claims, 8 Drawing Sheets

CONVERSION TRACKING AND CONTEXT PRESERVING SYSTEMS AND METHODS

CROSS-REFERENCE TO RELATED APPLICATIONS

This application is a continuation of and claims priority from co-pending U.S. patent application Ser. No. 13/966,118, filed on Aug. 13, 2013, entitled "CONVERSION TRACKING AND CONTEXT PRESERVING SYSTEMS AND METHODS," which is a continuation-in-part of U.S. patent application Ser. No. 13/855,649; filed Apr. 2, 2013; titled REMOTE APPLICATION INVOCATION SYSTEM AND METHOD, which is a continuation of U.S. patent application Ser. No. 12/852,730 (now U.S. Pat. No. 8,438,245); filed Aug. 9, 2010; titled REMOTE APPLICATION INVOCATION SYSTEM AND METHOD; which is a continuation-in-part of U.S. patent application Ser. No. 13/855,641; filed Apr. 2, 2013; titled SMART LINK SYSTEM AND METHOD; which is a continuation of U.S. patent application Ser. No. 13/036,950 (now U.S. Pat. No. 8,433,800); filed Feb. 28, 2011; titled SMART LINK SYSTEM AND METHOD. The above-cited applications are hereby incorporated herein by reference, in their entireties, for all purposes.

FIELD

This disclosure is directed to software, and more particularly, to systems and methods by which a server device can track and provide context for application installations on remote client devices.

BACKGROUND

An application store (also commonly referred to as an "app" store, "app" marketplace, or the like) is a type of digital distribution platform for application software that users may opt to install on devices of a particular type. In recent years, application stores have become a common component on personal computers, smartphones, tablets, and the like.

Application providers typically write an optionally-installable application for a given type of device and submit the application to an application-store provider, which makes the application available for users to purchase and/or download via an application store.

Once a user has installed such an application on a given device, the device may be able to use the application to access information payloads provided by the application provider and/or by third-parties. In many cases, an application provider may also provide a website that can be used to access at least some of the same information payloads that can be accessed by an optionally-installable application.

For example, a content provider, such as a blogging platform, social network, news portal, or the like, may provide a website by which posts, articles, or other information payloads may be accessed by web-browser software executing on remote devices. That content provider may also provide an optionally-installable application that can be obtained from an application store and, once installed, used to access some or all of the same posts, articles, or other information payloads.

In many cases, such a content provider may wish to promote its optionally-installable application for various reasons (e.g., a native application may provide a superior user experience than a website, the content provider may earn revenue when users obtain and use its optionally-installable application, or the like). To that end, many content providers detect when a visiting device is of a type for which an optionally-installable application is available so that their websites may notify the visitor that an optionally-installable application is available and/or encourage the visitor to obtain an optionally-installable application.

However, such app-promotion activities can detract from the user's experience with a given content provider. For example, in one common scenario, a user may encounter a link that purports to identify an information payload (e.g., an amusingly-captioned photograph of an adorable kitten) that the user wishes to view or otherwise consume. Upon following the link to a content provider's website, the user is presented not with an amusing and adorable kitten photograph, but with a notification indicating that the content provider has published an application available on the user's device.

If the user decides not to install the application, then the user may proceed to view the desired photograph in the device's web browser, being thereby amused by the cleverness of the caption and/or the adorableness of the kitten, but being deprived of whatever benefits the native application may provide.

On the other hand, if the user decides to obtain and install the application, the application typically does not "know" that the user was trying to access a particular photograph or other resource, often forcing the user to search for or independently navigate to the desired photograph from within the application. This is but one common scenario in which a content provider's application-promotion may hinder a user's ability to consume a desired information payload.

In an effort to address some of the shortcomings of previous application-promotion methods, in recent versions of the iOS operating system (provided by Apple Inc. of Cupertino, Calif.), the Safari web browser includes a "Smart App Banner" feature. When the user visits a given page that has an "apple-itunes-app" meta tag, a "Smart App Banner" will automatically determine whether an indicated application is available for and installed on the user's device. When the indicated application is not installed on the user's device, tapping on the banner will opens the application's entry in the iOS App Store.

After the application is installed, if the user returns to the same page in the Safari web browser, tapping the banner will open the installed application, and the Safari web browser will pass to the application an URL (indicated in the "apple-itunes-app" meta tag of the page) that the application can use to present an appropriate resource to the user.

However, if the user launches the application from the iOS App Store, from the iOS Home Screen, from the iOS Spotlight Search, or via any other means, the application has no previously known method to determine, for example, that the user installed the application while attempting to access a particular web page.

DESCRIPTION

In various embodiments, as discussed below, various systems and methods may be employed to track and provide context for application installations on remote client devices.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 1:
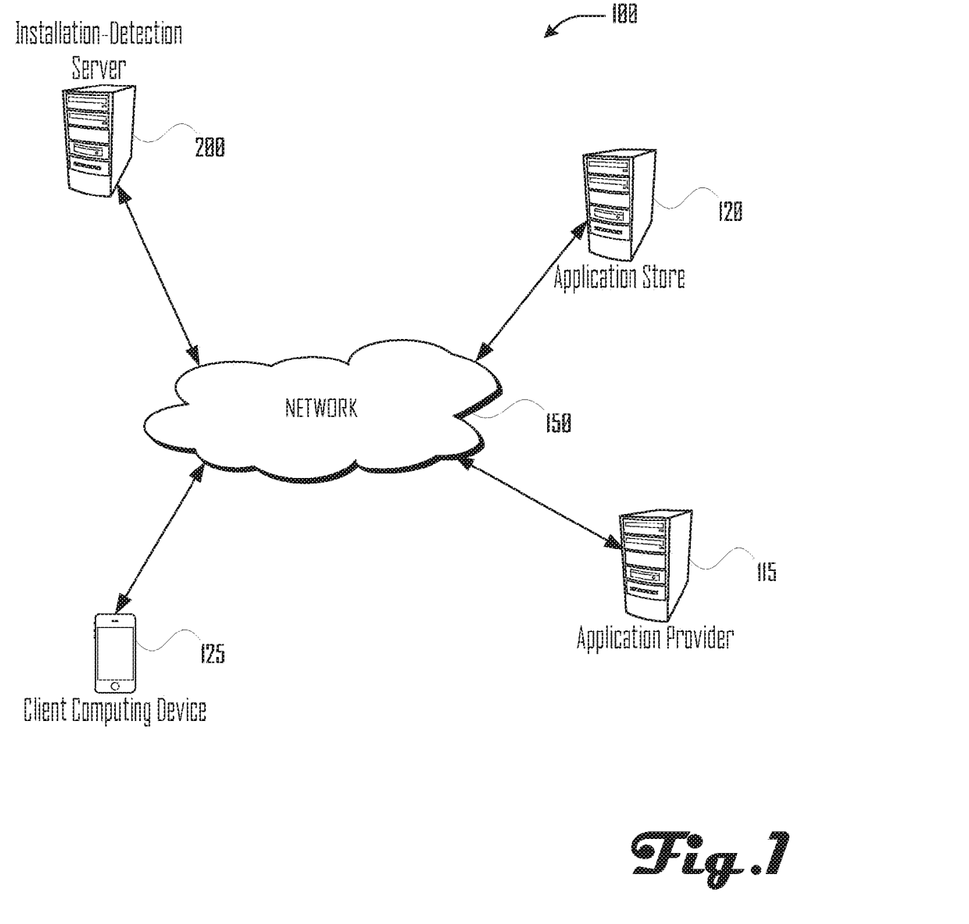
FIG. 1 illustrates a simplified installation-detection system in which application provider, application store, client computing device, and installation-detection server are connected to network.

FIG. 1 illustrates a simplified installation-detection system in which application provider 115, application store 120, client computing device 125, and installation-detection server 200 are connected to network 105.

In various embodiments, network 105 may include the Internet, a local area network ("LAN"), a wide area network ("WAN"), and/or other data network.

In various embodiments, additional infrastructure (e.g., cell sites, routers, gateways, firewalls, and the like), as well as additional devices may be present. Further, in some embodiments, the functions described as being provided by some or all of installation-detection server 200, application provider 115, and/or application store 120 may be implemented via various combinations of physical and/or logical devices. However, it is not necessary to show such infrastructure and implementation details in FIG. 1 in order to describe an illustrative embodiment.

Figure 2:
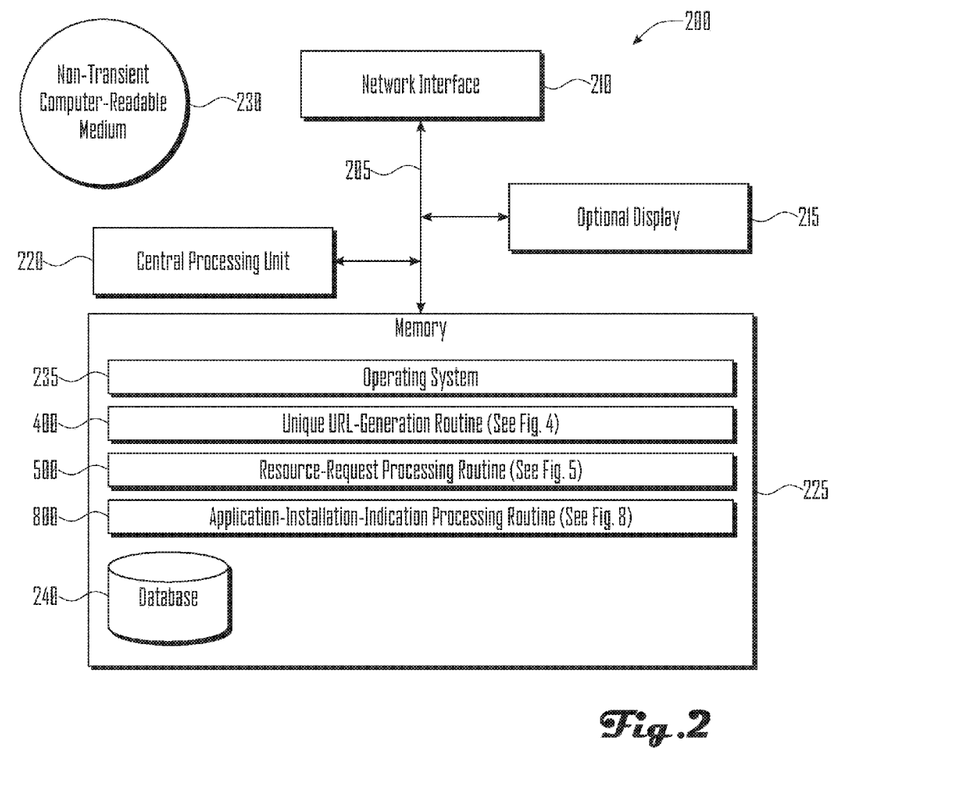
FIG. 2 illustrates several components of an exemplary installation-detection server in accordance with one embodiment.

FIG. 2 illustrates several components of an exemplary installation-detection server in accordance with one embodiment. In some embodiments, installation-detection server 200 may include many more components than those shown in FIG. 2. However, it is not necessary that all of these generally conventional components be shown in order to disclose an illustrative embodiment.

In various embodiments, installation-detection server 200 may comprise one or more physical and/or logical devices that collectively provide the functionalities described herein. In some embodiments, installation-detection server 200 may comprise one or more replicated and/or distributed physical or logical devices.

In some embodiments, installation-detection server 200 may comprise one or more computing services provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Installation-detection server 200 includes a bus 205 interconnecting several components including a memory 225; a network interface 210; an optional display 215; and a central processing unit 220.

Memory 225 generally comprises a random access memory ("RAM"), a read only memory ("ROM"), and a permanent mass storage device, such as a disk drive. The memory 225 stores program code for a routine 400 for generating a unique URL (see FIG. 4, discussed below); a routine 500 for processing a resource request (see FIG. 5, discussed below); and a routine 800 for processing an application-installation indication (see FIG. 8, discussed below). In addition, the memory 225 also stores an operating system 235

These and other software components may be loaded into memory 225 of installation-detection server 200 using a drive mechanism (not shown) associated with a non-transient computer-readable medium 230, such as a floppy disc, tape, DVD/CD-ROM drive, memory card, or the like.

Memory 225 also includes database 240. In some embodiments, installation-detection server 200 may communicate with database 240 via network interface 210, a storage area network ("SAN"), a high-speed serial bus, and/or via the other suitable communication technology.

In some embodiments, database 240 may comprise one or more storage services provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Figure 3:
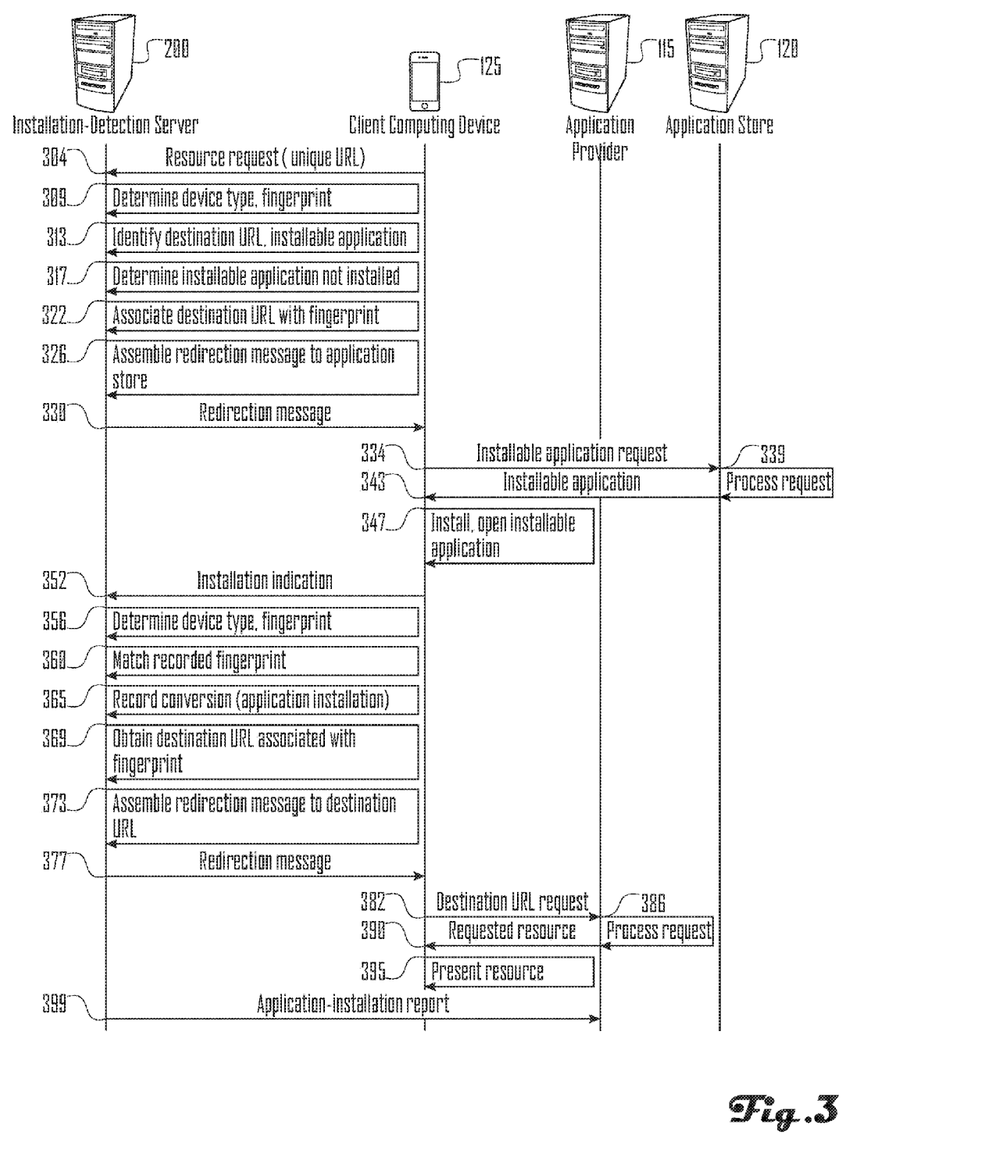
FIG. 3 illustrates an exemplary series of communications between application provider, client computing device, installation-detection server, and application store in accordance with one embodiment.

FIG. 3 illustrates an exemplary series of communications between application provider 115, client computing device 125, installation-detection server 200, and application store 120 in accordance with one embodiment. The communications shown in FIG. 3 do not encompass every combination of possibilities in which the systems and methods provided herein may be employed. Rather, the illustrated communications merely provide an overview of one simplified example scenario. Additional variations and alternatives are described more fully in the Figures and description that follow.

Figure 4:
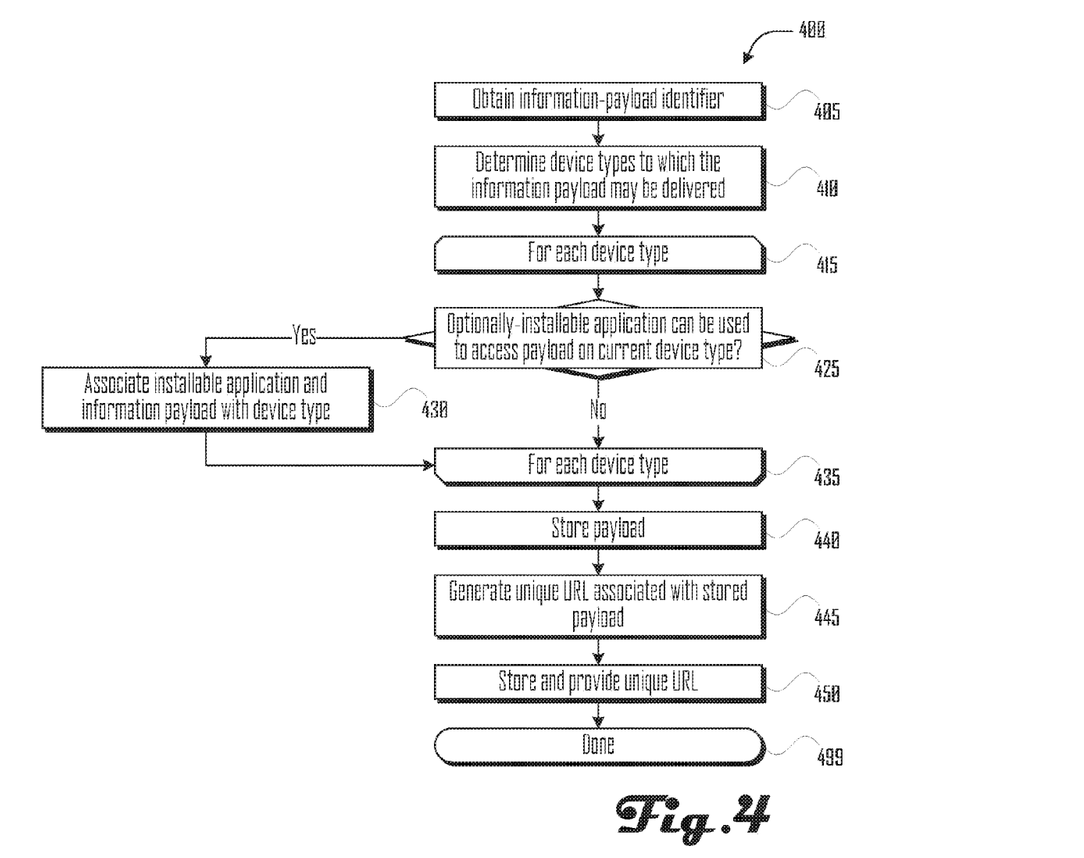
FIG. 4 illustrates a routine for generating a previously-generated unique URL, such as may be performed by an installation-detection server in accordance with one embodiment.

Beginning the illustrated sequence of communications, client computing device 125 sends to installation-detection server 200 a request 304 for a resource identified by a unique URL that was previously generated by installation-detection server 200 according to a routine such as routine 400, shown in FIG. 4. In many cases, the request 304 may be sent by a web-browser application executing on client computing device 125.

In many embodiment, request 304 may conform to the Hypertext Transfer Protocol ("HTTP") application protocol, according to which request 304 may include metadata values associated with several HTTP header fields.

Installation-detection server 200 determines 309 a device type of the requesting device and identifies the requesting device. In the illustrated scenario, installation-detection server 200 identifies the requesting device via a "fingerprint" identifier, based at least in part on metadata associated with the resource-request, that is likely to distinguish the requesting device from most or all other devices.

As discussed above, the request may conform to the HTTP protocol, which defines many standard HTTP header fields, and many other non-standard request headers are commonly employed. In various embodiments, some or all of the HTTP header field values provided when the client computing device 125 makes a request may be processed along with additional request metadata to create a "fingerprint" of the request. Such "fingerprint" identifiers are discussed further in relation to block 630 of FIG. 6, below.

Installation-detection server 200 processes the request, including identifying 313 a destination URL associated with the unique URL, and identifying an installable application associated with the previously-generated unique URL and the destination device type.

Installation-detection server 200 determines 317 that the installable application is not installed on the requesting device. For example, in one embodiment, installation-detection server 200 may provide to client computing device 125 a piece of executable code (e.g., a JavaScript function) for execution on client computing device 125 that may report to installation-detection server 200 whether the device can handle a URL or URI scheme that is associated with the installable application in question.

The generic syntax for URI schemes is defined in Request for Comments ("RFC") memorandum 3986 published by the Internet Engineering Task Force ("IETF"). According to RFC 3986, a URI (including a URL) consists of four parts:
<scheme name>: <hierarchical part> [ ? <query> ] [ # <fragment> ]

A URI begins with a scheme name that refers to a specification for assigning identifiers within that scheme. The scheme name consists of a letter followed by any combination of letters, digits, and the plus ("+"), period ("."), or hyphen ("-") characters; and is terminated by a colon (":").

The hierarchical portion of the URL is intended to hold identification information that is hierarchical in nature. Often this part is delineated with a double forward slash ("//"), followed by an optional authority part and an optional path.

The optional query portion is delineated with a question mark and contains additional identification information that is not necessarily hierarchical in nature. Together, the path part and the query portion identify a resource within the scope of the URI's scheme and authority. The query string syntax is not generically defined, but is commonly organized as a sequence of zero or more <key>=<value> pairs separated by a semicolon or ampersand, for example:
key1=value1;key2=value2;key3=value3 (Semicolon), or
key1=value1&key2=value2&key3=value3 (Ampersand)

Much of the above information is taken from RFC 3986, which provides additional information related to the syntax and structure of URIs. RFC 3986 is hereby incorporated by reference, for all purposes.

Installation-detection server 200 records 322 contextual metadata associated with the request, including information such as some or all of the following: the identified destination URL, a date and/or time at which the request was received, the requesting-device "fingerprint", an application-identifier associated with the installable application, and the like.

Installation-detection server 200 assembles 326 a redirection message that will allow the requesting device to obtain the installable application. There are many well-known methods of providing a redirection message, including using HTTP redirection status codes (e.g., 301, 302, 307, and the like), using a "Refresh" meta tag or HTTP refresh header, using a JavaScript redirect, and the like.

A typical redirection message that will allow the requesting device to obtain the installable application may include an application-identifier that identifies the installable application in question to application store 120.

In some embodiments, the redirection message may include a compound URL such as described in U.S. Pat. No. 8,433,800 (incorporated herein). See also subroutine 700, shown in FIG. 7 (discussed below).

Installation-detection server 200 sends to client computing device 125 the redirection message 330.

Acting upon the redirection message, client computing device 125 sends to application store 120 a request 334 for the installable application.

Application store 120 processes 339 the request and sends to client computing device 125 the installable application 343.

Client computing device 125 installs and opens 347 the installable application.

When the installable application is run after being installed, it is configured to cause client computing device 125 to send to installation-detection server 200 an installation indication 352 indicating that the installable application was installed on client computing device 125. In the illustrated scenario, the installation indication further requests a "context" to present to the user, such as a resource that the user has recently evidenced a desire to consume.

Installation-detection server 200 determines 356 a device type of the requesting device and identifies the requesting device. In the illustrated scenario, installation-detection server 200 identifies the requesting device via a "fingerprint" identifier, based at least in part on metadata associated with the resource-request, that is likely to distinguish the requesting device from most or all other devices.

As discussed above, the request may conform to the HTTP protocol, which defines many standard HTTP header fields, and many other non-standard request headers are commonly employed. In various embodiments, some or all of the HTTP header field values provided when the client computing device 125 makes a request may be processed along with additional request metadata to create a "fingerprint" of the request. Such "fingerprint" identifiers are discussed further in relation to block 630 of FIG. 6, below.

Installation-detection server 200 matches the just-determined fingerprint with the recently-recorded fingerprint discussed above.

Having received an installation indication from a device that can be matched to a recent unique URL request and that was recently redirected to application store 120, installation-detection server 200 infers that the installable application was installed in response to the redirection and records 365 (e.g., in database 240) an application-installation event associated with client computing device 125 and/or the previously-generated unique URL.

Installation-detection server 200 obtains 369 the recently-recorded destination URL that is associated with the recent unique URL request sent by client computing device 125.

Installation-detection server 200 assembles 373 a redirection message that will allow the installable application executing on client computing device 125 to obtain the resource identified by the destination URL.

Installation-detection server 200 sends to client computing device 125 the redirection message 377.

Client computing device 125 sends to application provider 115 a request 382 for the resource identified by the destination URL.

Application provider 115 processes 386 the request and sends to client computing device 125 the requested resource 390.

The installable application executing on client computing device 125 presents 395 the resource that is associated with the unique URL that client computing device 125 requested (e.g. via a web-browser application) before the installable application was installed on client computing device 125.

Installation-detection server 200 sends to application provider 115 a report 399 indicating that client computing device 125 (or a device of client computing device's 125 type) installed the installable application after requesting the unique URL.

FIG. 4 illustrates a routine 400 for generating a previously-generated unique URL, such as may be performed by an installation-detection server 200 in accordance with one embodiment.

In block 405, routine 400 obtains an identifier (e.g. a URL) identifying an information payload, such as a web page, media content, or the like. In some cases, the identifier may be obtained from a content provider, and the information payload may be an asset provided by that content partner.

In block 410, routine 400 determines one or more device types to which the information payload may be delivered. In some cases, a different payload or a differently-formatted payload may be delivered to different device types. Additional disclosure about generating a unique URL that can be used to access device-type-specific information payloads may be found in U.S. Pat. No. 8,438,245 (incorporated herein).

Beginning in opening loop block 415, routine 400 processes each device type (as determined in block 410) in turn.

In decision block 425, routine 400 determines whether an optionally-installable application can be used to access the information payload on the current device type. Typically, the content provider or other entity that provided the information payload (as obtained in block 405) may provide an identifier identifying an optionally-installable application that can be used to access the information payload on the current device type. If such an identifier was provided, routine 400 proceeds to block 430. Otherwise, routine 400 proceeds to ending loop block 435.

In block 430, routine 400 associates the optionally-installable application determined in decision block 425 with the information payload (as obtained in block 405), e.g., by storing or updating a record in database 240.

In ending loop block 435, routine 400 iterates back to opening loop block 415 to process the next device type (as determined in block 410), if any.

In block 440, routine 400 stores, e.g. in database 240, the information payload and/or an identifier identifying the information payload.

In block 445, routine 400 generates a unique URL associated with the information payload stored in block 440.

In block 450, routine 400 stores the unique URL (as generated in block 445) and provides it for exposure to remote computing devices. As discussed further in U.S. Pat. No. 8,438,245 (incorporated herein), in various embodiments, the previously-generated unique URL may be exposed to remote computing devices in a number of forms, including as a 2-d barcode or other machine-scannable code; as a link published via a web site or otherwise included in an HTML or similar document; or the like.

Routine 400 ends in ending block 499.

Figure 5:
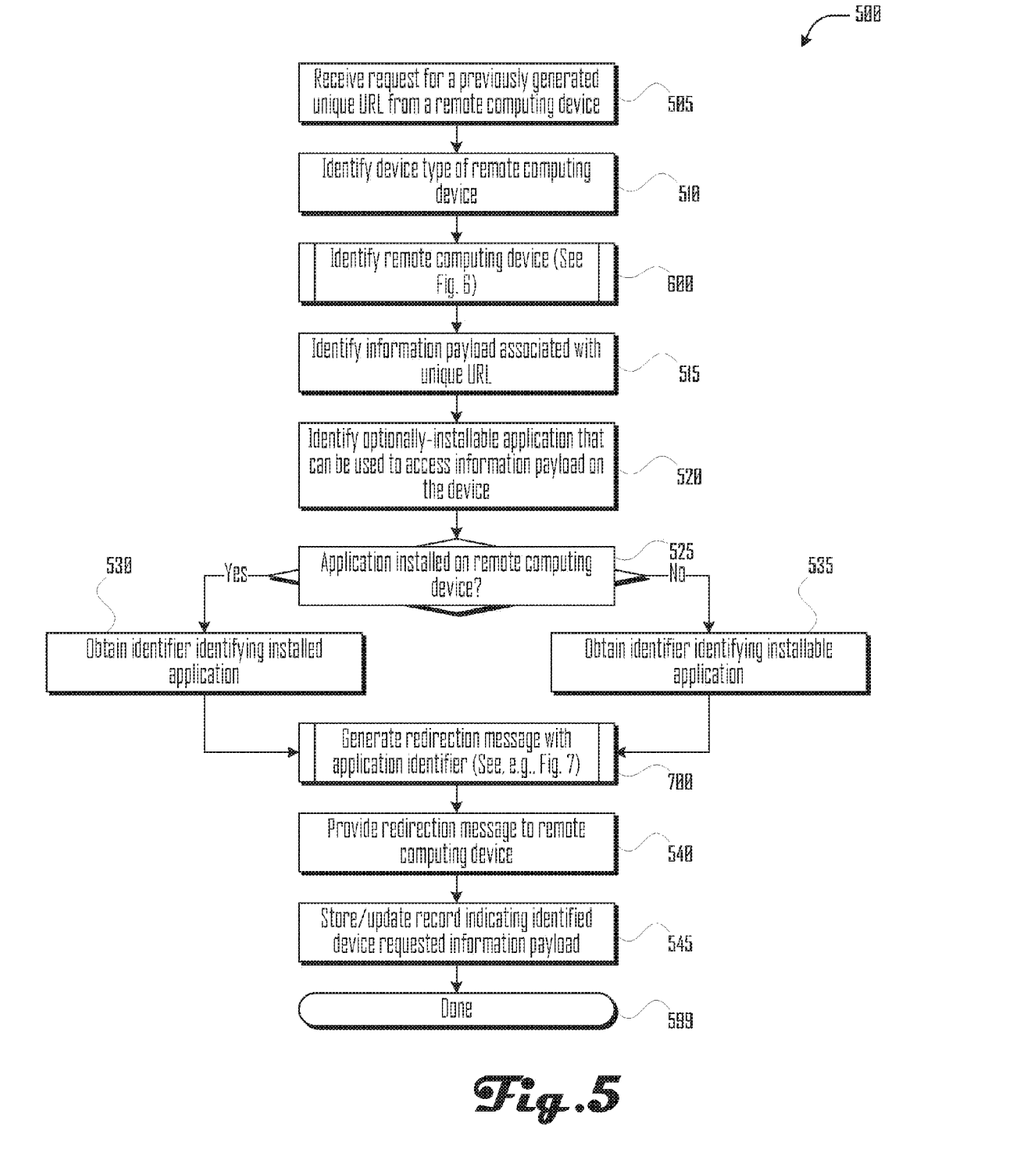
FIG. 5 illustrates a routine for processing a resource request, such as may be performed by an installation-detection server in accordance with one embodiment.

FIG. 5 illustrates a routine 500 for processing a resource request, such as may be performed by an installation-detection server 200 in accordance with one embodiment.

In block 505, routine 500 receives, from a remote computing device, a request for a unique URL that was previously generated according to a method such as that shown in FIG. 4, discussed above. In some embodiments, the request may conform to the HTTP protocol.

In block 510, routine 500 identifies a device type of the remote computing device. For example, in one embodiment, metadata associated with an HTTP request, such as a "User-Agent" header or the like, may be used to determine a device type of the remote computing device.

In subroutine block 600, routine 500 calls subroutine 600 (see FIG. 6, discussed below) to determine an identifier that can be used to distinguish the requesting remote computing device from some or all other remote computing devices that may interact with routine 500.

In block 515, routine 500 identifies an information payload associated with unique URL. For example, in one embodiment, routine 500 may locate a record in database 240 that was previously keyed to or otherwise associated with the previously-generated unique URL, such as described in connection with block 430 of FIG. 4 (above).

In block 520, routine 500 identifies an optionally-installable application that can be used to access the information payload on the requesting device. For example, in one embodiment, routine 500 may locate a record in database 240 that was previously keyed to or otherwise associated with the unique URL, such as described in connection with block 430 of FIG. 4 (above).

In decision block 525, routine 500 determines whether the optionally-installable application (as identified in block 520) is installed on the requesting remote computing device. For example, in one embodiment, routine 500 may provide to the remote computing device a piece of executable code (e.g., a JavaScript function) for execution on the remote computing device that may report to routine 500 whether the device can handle a URL or URI scheme that is associated with the optionally-installable application (as identified in block 520).

If the optionally-installable application is determined to be installed, routine 500 proceeds to block 530. Otherwise, routine 500 proceeds to block 535.

In block 530, routine 500 obtains an identifier by which the remote computing device may launch the optionally-installable application (that was determined in decision block 525 to be installed) to access the information payload.

In block 535, routine 500 obtains an identifier by which the remote computing device may obtain and install the optionally-installable application that was determined to be not installed on the requesting remote computing device.

In either case, routine 500 may obtain an appropriate identifier by locating a record in database 240 that was previously keyed to or otherwise associated with the unique URL, such as described in connection with block 430 of FIG. 4 (above).

In subroutine block 700, routine 500 calls subroutine 700 (see FIG. 7, discussed below) to generate a redirection message by which the remote computing device can launch and/or install the optionally-installable application according to the application identifier obtained in block 530 or block 535.

In block 540, routine 500 provides to the remote computing device the redirection message as generated in subroutine block 700.

In block 545, routine 500 stores and/or updates a record (e.g., in database 240) indicating that at the current date and/or time, the remote computing device (as identified in subroutine block 600) requested the information payload (as identified in block 515) and was redirected according to the redirection message (as generated in subroutine block 700).

Routine 500 ends in ending block 599.

Figure 6:
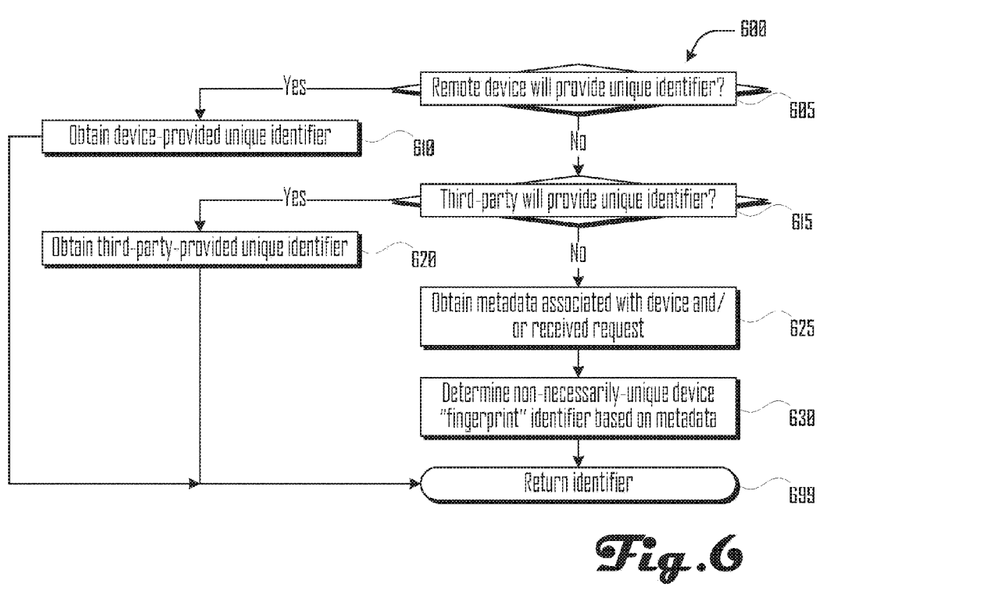
FIG. 6 illustrates a subroutine for identifying a given remote computing device based on a given request, such as may be performed by an installation-detection server in accordance with one embodiment.

FIG. 6 illustrates a subroutine 600 for identifying a given remote computing device based on a given request, such as may be performed by an installation-detection server 200 in accordance with one embodiment.

In various embodiments, various methods may be available to identify a given remote computing device to at least some degree of certainty. Three common methods are described below in an alternative decision tree. However, in many cases, a given embodiment may be configured to use a particular method, without evaluating whether the other alternatives are available.

In some embodiments, a given remote computing device may be configured to provide a unique serial number or other device identifier to subroutine 600 upon request. In decision block 605, subroutine 600 determines whether the remote computing device will provide such a unique identifier. If so, subroutine 600 proceeds to block 610.

In block 610, subroutine 600 requests and obtains a unique serial number or other device identifier from the given remote computing device. In many embodiments, such a unique serial number or other device identifier may definitively distinguish the given remote computing device from all other devices.

In some embodiments, subroutine 600 may be configured to integrate with a third-party entity, such as a mobile network operator, wireless service provider, wireless carrier, or the like, that is able to identify the given remote computing device using an identifier such as an International mobile Subscriber Identity ("IMSI"), International Mobile Station Equipment Identity ("IMEI"), MSISDN, or the like. In decision block 615, subroutine 600 determines whether such a third-party will identify the given remote computing device. Or alternately, in some embodiments, subroutine 600 may be executing on a device operated by such an entity. If so, then subroutine 600 proceeds to block 620.

In block 620, subroutine 600 obtains the third-party-provided unique identifier. In many embodiments, such an identifier may definitively distinguish the given remote computing device from all other devices.

Otherwise, if no definitive identifier is obtainable, in block 625, subroutine 600 obtains metadata associated with the given remote computing device and/or the given request.

In many embodiments, the given request may conform to the HTTP protocol, which defines many standard HTTP header fields. Additionally, many non-standard request headers are commonly employed. In such embodiments, subroutine 600 may obtain metadata values provided via HTTP header fields, as well as additional metadata such as a current date and/or time.

In block 630, subroutine 600 determines a (non-necessarily-unique) device "fingerprint" identifier based on metadata (as obtained in block 625). In various embodiments, some or all of the HTTP header field values provided when the given remote computing device makes the given request may be processed, possibly along with additional request metadata (e.g., a current date and/or time) to create a "fingerprint" of the request.

For example, in one embodiment, an IP address associated with the client computing device 125 may be combined with the value of a "User-Agent" HTTP request header to create a request fingerprint that, while it may not uniquely identify the client computing device 125, may distinguish requests made by the client computing device 125 from requests made by most other devices.

To combine metadata into a request "fingerprint", subroutine 600 may employ techniques such as concatenating the metadata values and/or processing the metadata values via a cryptographic hash function.

Subroutine 600 ends in ending block 699, returning to the caller the identifier obtained or determined in block 610, block 620, or block 630.

Figure 7:
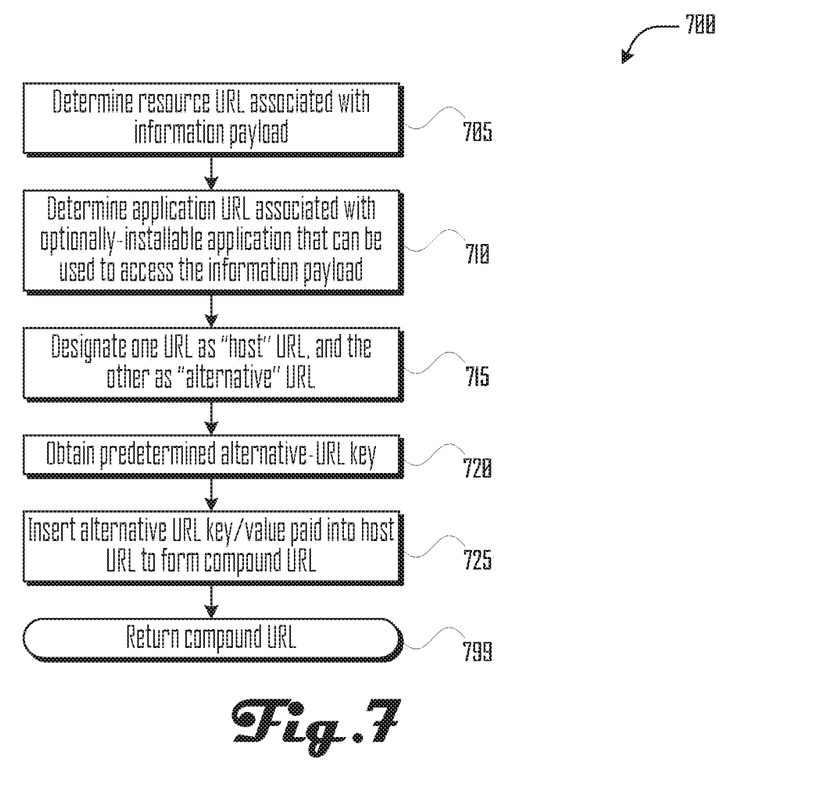
FIG. 7 illustrates a subroutine for generating a compound URL for a given information payload and a given optionally-installable application, such as may be performed by an installation-detection server in accordance with one embodiment.

FIG. 7 illustrates a subroutine 700 for generating a compound URL for a given information payload and a given optionally-installable application, such as may be performed by an installation-detection server 200 in accordance with one embodiment.

FIG. 7 illustrates a simplified version of compound-URL systems and methods similar to those described in U.S. Pat. No. 8,433,800 (incorporated herein). In some embodiments, subroutine 700 may utilize additional features variously described in U.S. Pat. No. 8,433,800.

In block 705, subroutine 700 determines a resource URL associated with the given information payload. In some embodiments, the resource URL may be suitable for accessing the information payload via a general-purpose web-browsing application. In other embodiments, the resource URL may be suitable for accessing the information payload via the given optionally-installable application on one or more computing platforms.

In block 710, subroutine 700 determines an application URL associated with a given optionally-installable application that can be used to access the information payload. In some cases, the application URL may include a URL scheme that is associated with the given optionally-installable application on one or more types of computing devices, such that resolving the application URL on such a device will invoke the optionally-installable application to access the information payload.

In other cases, the application URL may identify the given optionally-installable application within an application store on a particular computing platform, such that resolving the application URL on a certain type of device will invoke an application store application to obtain and install the optionally-installable application.

In block 715, subroutine 700 designates either the application URL or the resource URL as a "host" URL, and the other as a "alternative" URL. Generally, providing a compound URL may allow a remote device to access the information payload via an optionally-installable application if the optionally-installable application is installed or to obtain the optionally-installable application if it is not installed.

In some embodiments, when processing a compound URL, a computing device may be configured to attempt to resolve the "alternative" URL first, falling back to the "host" URL if the "alternative" URL cannot be resolved (e.g. because an optionally-installable application is not installed). In other embodiments, a computing device may be configured to attempt to resolve the "host" URL first, falling back the "alternative" URL if the "host" URL cannot be resolved.

In some embodiments, subroutine 700 may designate the "host" URL and the "alternative" URL such that a computing device of a certain type will first attempt to resolve the resource URL to invoke the optionally-installable application to access the information payload, falling back to the application URL to obtain and install the optionally-installable application if invoking the optionally-installable application fails.

In block 720, subroutine 700 obtains a predetermined alternative-URL key. As discussed further in U.S. Pat. No. 8,433,800 (incorporated herein), in various embodiments, subroutine 700 may obtain a key such as "appURI" or "altURI" to indicate the presence of a "alternative" URL within a compound URL.

In block 725, subroutine 700 inserts a "alternative" URL key/value pair into the "host" URL to form a compound URL. In various embodiments, inserting the "alternative" URL key/value pair may include percent-encoding the "alternative" URL, or otherwise encoding the "alternative" URL such that it can be validly represented within the query portion of the "host" URL according to the scheme named in the "host" URL.

Subroutine 700 ends in ending block 799, returning the compound URL formed in block 725 to the caller.

Figure 8:
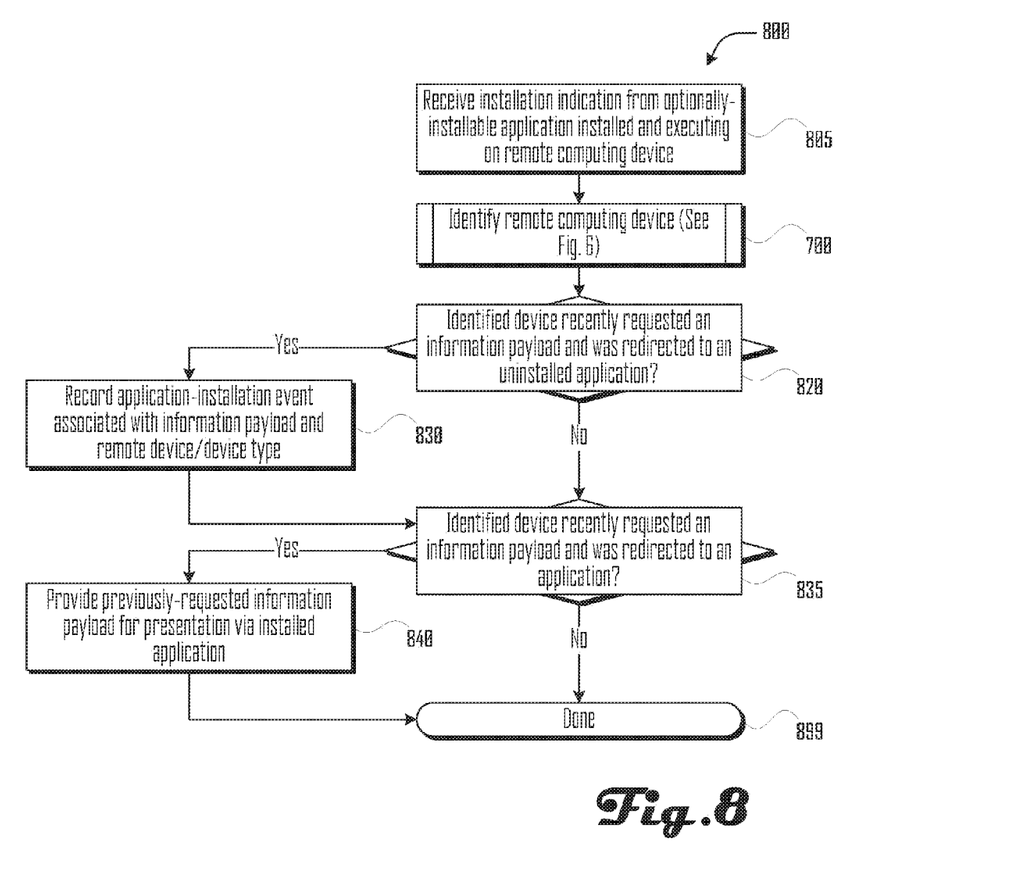
FIG. 8 illustrates a routine for processing an application-installation indication, such as may be performed by an installation-detection server in accordance with one embodiment.

FIG. 8 illustrates a routine 800 for processing an application-installation indication, such as may be performed by an installation-detection server 200 in accordance with one embodiment.

In various embodiments, an optionally-installable application may be configured to contact installation-detection server 200 when the optionally-installable application is launched after being installed on a remote computing device. In block 805, routine 800 receives such an installation indication from an optionally-installable application installed and executing on a remote computing device. In various embodiments, receiving the installation indication may include receiving a request for a first-run resource identified by a predetermined URL, receiving a message and/or data via a web application programming interface, or the like.

In subroutine block 600, routine 800 calls subroutine 600 (see FIG. 6, discussed above) to determine an identifier that can be used to distinguish the installation-indicating remote computing device from some or all other remote computing devices that may interact with routine 800.

In decision block 820, routine 800 determines whether the remote computing device (as identified in subroutine block 600) recently requested an information payload via a unique URL, as described in connection with block 505 (see FIG. 5, discussed above).

For example, in one embodiment, routine 800 may locate a record in database 240 that was previously keyed to or otherwise associated with the remote computing device (as identified in subroutine block 600), such as described in connection with block 545 (see FIG. 5, discussed above).

If in decision block 820, routine 800 determines that the remote computing device (as identified in subroutine block 600) recently requested such an information payload, then routine 800 proceeds to decision block 825. Otherwise, routine 800 proceeds to ending block 899.

In decision block 825, routine 800 determines whether, upon requesting the information payload, the remote computing device (as identified in subroutine block 600) was redirected with a message enabling the remote computing device to obtain and install the optionally-installable application, as described in connection with block 540 (see FIG. 5, discussed above).

For example, in one embodiment, routine 800 may locate a record in database 240 that was previously keyed to or otherwise associated with the remote computing device (as identified in subroutine block 600), such as described in connection with block 545 (see FIG. 5, discussed above).

If in decision block 825, routine 800 determines that it has received an installation indication from a device that can be matched to a recent unique URL request and that was recently redirected to application store 120, routine 800 may infer that the optionally-installable application was installed in response to the redirection, in which case, routine 800 proceeds to block 830. Otherwise, routine 800 proceeds to block 835.

In block 830, routine 800 records (e.g., in database 240) an application-installation event associated with some or all of the remote computing device (as identified in subroutine block 600), its device type, the information payload, and/or the unique URL.

In block 835, routine 800 provides the previously-requested information payload for presentation on the remote computing device via the installed and executing optionally-installable application.

Routine 800 ends in ending block 899.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A method comprising:
    receiving, at a computing device, a request for content from a device of a user, said received request being responsive to detected input from said user device respective to a uniform resource locator (URL) associated with said content;
    analyzing, via the computing device, said request and identifying contextual metadata associated with said request, said contextual metadata comprising information corresponding to the user device's ability to render said content in a native application for said content;
    identifying, via the computing device, on a network, a resource URL of said native application for installing said native application;
    creating, via the computing device, a redirection message in response to said request, said creation comprising combining said content URL and said resource URL into a compound URL, said redirection message comprising said compound URL; and
    communicating, via the computing device over the network, said redirection message to said user device, said redirection message automatically facilitating installation of said native application prior to initiating rendering of said content.

2. The method of claim 1, wherein said communication further comprises:
    communicating information associated with said resource URL portion of said compound URL prior to communicating information associated with said content URL portion of said compound URL.

3. The method of claim 1, further comprising:
  determining, based on said contextual metadata, that said user device is not equipped with an already installed version of said native application for rendering said content; and
  automatically initiating, over the network, said communication of said redirection message.

4. The method of claim 3, wherein said native application is an optionally-installed application.

5. The method of claim 1, wherein said contextual metadata comprises an identifier of each application installed on said user device prior to said request.

6. The method of claim 1, wherein said contextual metadata comprises metadata selected from a group consisting of: said URL associated with said content, a date associated with said reception of the request, a time associated with the reception of the request, a fingerprint of said user device, and an application-identifier associated with an installable application native for rendering said content.

7. The method of claim 1, further comprising:
  communicating, over the network, executable code to said user device, wherein said communication facilitates execution of said executable code on said user device;
  receiving, in response to said communication, an output from said user device executing said executable code; and
  determining, based on said output, whether said user device is capable of installing the native application associated with said content.

8. The method of claim 7, wherein said capability determination comprises determining whether the user device is able to handle a URL or Uniform Resource Identifier (URI) scheme associated with said native application.

9. The method of claim 1, further comprising:
  identifying, based on said analysis of said contextual metadata, a type of said user device, wherein said resource URL is associated with a version of said native application for said user device type.

10. A non-transitory computer-readable storage medium tangibly encoded with computer-executable instructions, that when executed by a processor associated with a computing device, perform a method comprising:
  receiving a request for content from a device of a user, said received request being responsive to detected input from said user device respective to a uniform resource locator (URL) associated with said content;
  analyzing said request and identifying contextual metadata associated with said request, said contextual metadata comprising information corresponding to the user device's ability to render said content in a native application for said content;
  identifying, on a network, a resource URL of said native application for installing said native application;
  creating a redirection message in response to said request, said creation comprising combining said content URL and said resource URL into a compound URL, said redirection message comprising said compound URL; and
  communicating, over the network, said redirection message to said user device, said redirection message automatically facilitating installation of said native application prior to initiating rendering of said content.

11. The non-transitory computer-readable storage medium of claim 10, wherein said communication further comprises:
  communicating information associated with said resource URL portion of said compound URL prior to communicating information associated with said content URL portion of said compound URL.

12. The non-transitory computer-readable storage medium of claim 10, further comprising:
  determining, based on said contextual metadata, that said user device is not equipped with an already installed version of said native application for rendering said content; and
  automatically initiating, over the network, said communication of said redirection message.

13. The non-transitory computer-readable storage medium of claim 10, wherein said contextual metadata comprises an identifier of each application installed on said user device prior to said request.

14. The non-transitory computer-readable storage medium of claim 10, wherein said contextual metadata comprises metadata selected from a group consisting of: said URL associated with said content, a date associated with said reception of the request, a time associated with the reception of the request, a fingerprint of said user device, and an application-identifier associated with an installable application native for rendering said content.

15. The non-transitory computer-readable storage medium of claim 10, further comprising:
  communicating, over the network, executable code to said user device, wherein said communication facilitates execution of said executable code on said user device;
  receiving, in response to said communication, an output from said user device executing said executable code; and
  determining, based on said output, whether said user device is capable of installing the native application associated with said content.

16. The non-transitory computer-readable storage medium of claim 15, wherein said capability determination comprises determining whether the user device is able to handle a URL or Uniform Resource Identifier (URI) scheme associated with said native application.

17. The non-transitory computer-readable storage medium of claim 10, further comprising:
  identifying, based on said analysis of said contextual metadata, a type of said user device, wherein said resource URL is associated with a version of said native application for said user device type.

18. A system comprising:
  a processor;
  a non-transitory computer-readable storage medium for tangibly storing thereon program logic for execution by the processor, the program logic comprising:
    logic executed by the processor for receiving a request for content from a device of a user, said received request being responsive to detected input from said user device respective to a uniform resource locator (URL) associated with said content;
    logic executed by the processor for analyzing said request and identifying contextual metadata associated with said request, said contextual metadata comprising information corresponding to the user device's ability to render said content in a native application for said content;
    logic executed by the processor for identifying, on a network, a resource URL of said native application for installing said native application;
    logic executed by the processor for creating a redirection message in response to said request, said creation comprising combining said content URL and said resource URL into a compound URL, said redirection message comprising said compound URL; and logic executed by the processor for communicating, over the network, said redirection message to said user device, said redirection message automatically facilitating installation of said native application prior to initiating rendering of said content.

19. The system of claim 18, further comprising:

logic executed by the processor for communicating information associated with said resource URL portion of said compound URL prior to communicating information associated with said content URL portion of said compound URL.

20. The system of claim 18, further comprising:

logic executed by the processor for communicating, over the network, executable code to said user device, wherein said communication facilitates execution of said executable code on said user device;

logic executed by the processor for receiving, in response to said communication, an output from said user device executing said executable code; and logic executed by the processor for determining, based on said output, whether said user device is capable of installing the native application associated with said content, wherein said capability determination comprises determining whether the user device is able to handle a URL or Uniform Resource Identifier (URI) scheme associated with said native application.

* * * * *